United States Patent
Santo et al.

(10) Patent No.: US 8,749,894 B2
(45) Date of Patent: Jun. 10, 2014

(54) LENS BARREL

(75) Inventors: Takeo Santo, Osaka (JP); Akira Koga, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/639,095

(22) PCT Filed: Sep. 16, 2011

(86) PCT No.: PCT/JP2011/005240
§ 371 (c)(1),
(2), (4) Date: Oct. 2, 2012

(87) PCT Pub. No.: WO2012/035779
PCT Pub. Date: Mar. 22, 2012

(65) Prior Publication Data
US 2013/0027789 A1    Jan. 31, 2013

(30) Foreign Application Priority Data

Sep. 17, 2010  (JP) .................................. 2010-210211

(51) Int. Cl.
G02B 15/14    (2006.01)
G02B 7/02    (2006.01)

(52) U.S. Cl.
USPC ............ 359/694; 359/696; 359/823; 348/345

(58) Field of Classification Search
USPC ................ 359/822, 823, 825, 826, 694–704; 396/72–80, 125, 133, 134, 137, 534; 348/341, 345, 346, 353, 360, 220.1, 348/240.2, 333.01, 333.02, 333.08, E5.022, 348/E5.024, E5.025, E5.045, E5.055
See application file for complete search history.

(56) References Cited

U.S. PATENT DOCUMENTS

| 4,729,644 | A  | * | 3/1988 | Ueyama ......................... 359/701 |
| 5,148,199 | A  |   | 9/1992 | Kohmoto et al. |
| 6,721,004 | B1 |   | 4/2004 | Kato |
| 7,158,322 | B2 | * | 1/2007 | Araki ............................ 359/823 |
| 7,352,387 | B2 |   | 4/2008 | Yamamoto |
| 7,864,227 | B2 |   | 1/2011 | Aoyama |

(Continued)

FOREIGN PATENT DOCUMENTS

| JP | 2787500 B | 6/1998 |
| JP | H11-271592 A | 10/1999 |

(Continued)

OTHER PUBLICATIONS

International Search Report of PCT Application No. PCT/JP2011/005240.

(Continued)

*Primary Examiner* — Loha Ben
(74) *Attorney, Agent, or Firm* — Shinjyu Global IP (57) ABSTRACT

A lens barrel is provided that includes an optical system and a plurality of interface units. The optical system includes an optical axis and a focal distance. The focal distance is configured to be adjusted by the optical system. The plurality of interface units includes a first interface unit and a second interface unit. Each of the first interface unit and the second interface unit are configured to accept from a user an operation to adjust the focal distance. Each of the first interface unit and the second interface unit are configured to be operated around the optical axis.

7 Claims, 7 Drawing Sheets

(56) References Cited

U.S. PATENT DOCUMENTS

| | | | |
|---|---|---|---|
| 7,872,816 B2 * | 1/2011 | Chen et al. | 359/819 |
| 7,933,082 B2 * | 4/2011 | Sato | 359/825 |
| 8,098,323 B2 * | 1/2012 | Yumiki et al. | 348/360 |
| 8,284,301 B2 * | 10/2012 | Honjo et al. | 348/371 |
| 8,350,945 B2 * | 1/2013 | Yumiki | 348/333.02 |
| 8,368,769 B2 * | 2/2013 | Yumiki | 348/220.1 |
| 2005/0174450 A1 | 8/2005 | Aoyama | |

FOREIGN PATENT DOCUMENTS

| | | |
|---|---|---|
| JP | 2000-305002 A | 11/2000 |
| JP | 2002-207239 A | 7/2002 |
| JP | 2004-070237 A | 3/2004 |
| JP | 2004-294657 A | 10/2004 |
| JP | 2005-099341 A | 4/2005 |
| JP | 2005-223766 A | 8/2005 |
| JP | 2007-108373 A | 4/2007 |
| JP | 2007-312297 A | 11/2007 |
| JP | 2008-026553 A | 2/2008 |
| JP | 2008-058914 A | 3/2008 |

OTHER PUBLICATIONS

International Search Report of co-pending PCT Application No. PCT/JP2011/005239.

Non-final Office Action for co-pending U.S. Appl. No. 13/638,618, issued Nov. 20, 2013.

Office Action for the corresponding Japanese Patent Application No. 2012-533872, dated Dec. 3, 2013.

Office Action for related Japanese Patent Application No. 2012-533871, dated Dec. 3, 2013.

* cited by examiner

LENS BARREL

BACKGROUND

1. Technical Field

The technology disclosed herein relates to a lens barrel, and more particularly relates to a lens barrel comprising an optical system capable of adjusting focal distance.

2. Background Art

Japanese Laid-Open Patent Application 2008-58914 discloses a lens barrel comprising an optical system capable of adjusting focal distance. The lens barrel of Japanese Laid-Open Patent Application 2008-58914 can be switched between electrical and manual operation, but there is only one interface unit for accepting focal distance adjustment operation.

SUMMARY

Meanwhile, if a plurality of interface units used for zoom setting are provided to a single lens barrel, then a rough adjustment-use interface unit and a fine adjustment-use interface unit can be separately provided, for example. However, when the number of interface units used for zoom setting increases, it becomes hard to decide which of these interface units to use.

One object of the technology disclosed herein is to provide a lens barrel in which it is easier to operate a plurality of interface units used for zoom setting.

A lens barrel is provided that includes an optical system and a plurality of interface units. The optical system includes an optical axis and a focal distance. The focal distance is configured to be adjusted by the optical system. The plurality of interface units includes a first interface unit and a second interface unit. Each of the first interface unit and the second interface unit is configured to accept from a user an operation to adjust the focal distance. Each of the first interface unit and the second interface unit are configured to be operated around the optical axis.

With the technology disclosed herein, it is possible to provide a lens barrel with which it is easier to operate a plurality of interface units used for zoom setting.

These and other objects, features, aspects and advantages of the present disclosure will become apparent to those skilled in the art from the following detailed description, which, taken in conjunction with the annexed drawings, discloses embodiments of the present disclosure.

BRIEF DESCRIPTION OF DRAWINGS

Referring now to the attached drawings which form a part of this original disclosure.

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (1) External Configuration of Camera System 1

Figure 1:
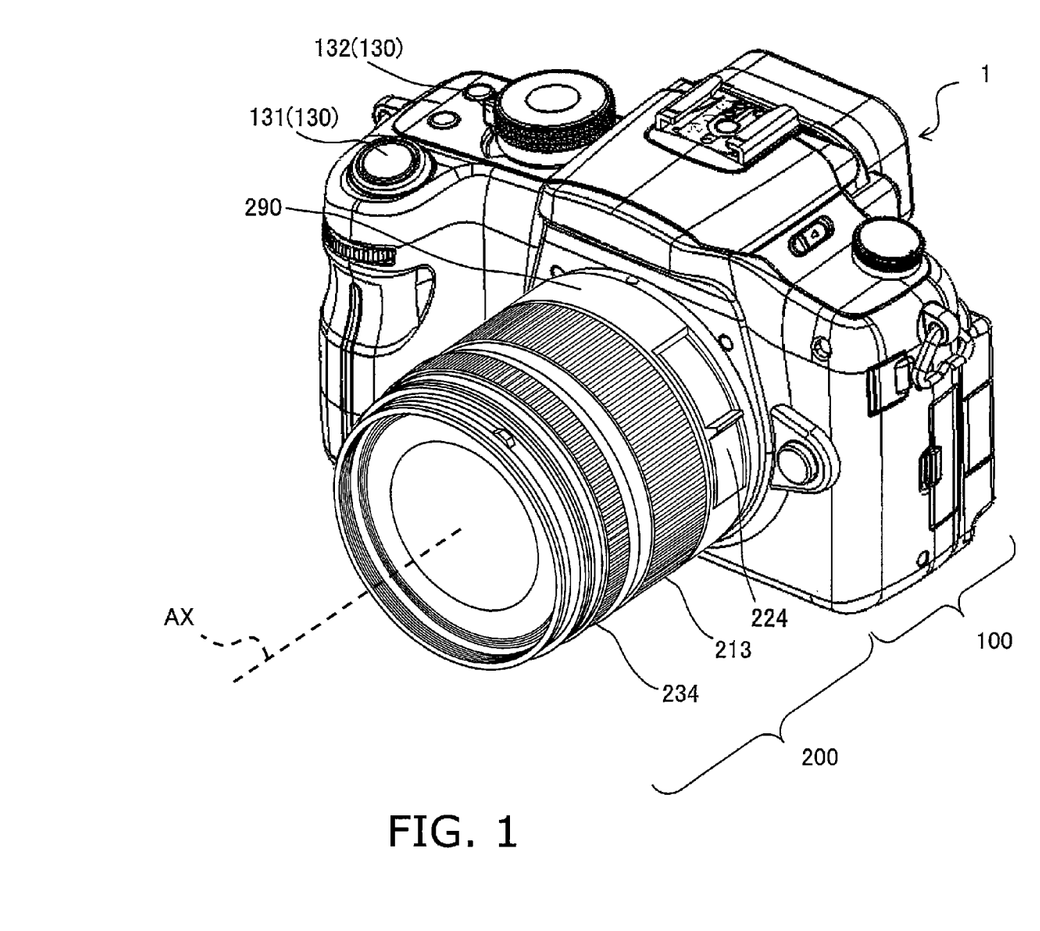
FIG. 1 is an oblique view of a camera system pertaining to a first embodiment.

The external configuration of the camera system 1 pertaining to a first embodiment will be described through reference to FIG. 1. FIG. 1 is an oblique view of the camera system 1. In the following description, the subject side of the camera system 1 is defined as the "front," the user side as the "rear" or "back," the vertically upper side in the landscape orientation of the camera system 1 as "upper," and the vertically lower side as "lower." The landscape orientation is the orientation of the camera system 1 when the long-side direction of a CMOS image sensor 110 is parallel to the horizontal direction in a captured image, and the short-side direction of the CMOS image sensor 110 is parallel to the vertical direction in a captured image.

As shown in FIG. 1, the camera system 1 comprises a camera body 100 and a lens unit 200 (an example of a lens barrel) that can be removably mounted to the camera body 100.

The camera body 100 has an interface component 130 attached to the upper face. The interface component 130 includes a release button 131 and a power switch 132. The lens unit 200 has a cylindrical lens barrel 290, and a zoom ring 213, a zoom lever 224, and a focus ring 234 attached to a side face of the lens barrel 290. The configuration of the camera body 100 and the lens unit 200 will be discussed in detail below.

(2) Internal Configuration of Camera System 1

Figure 2:
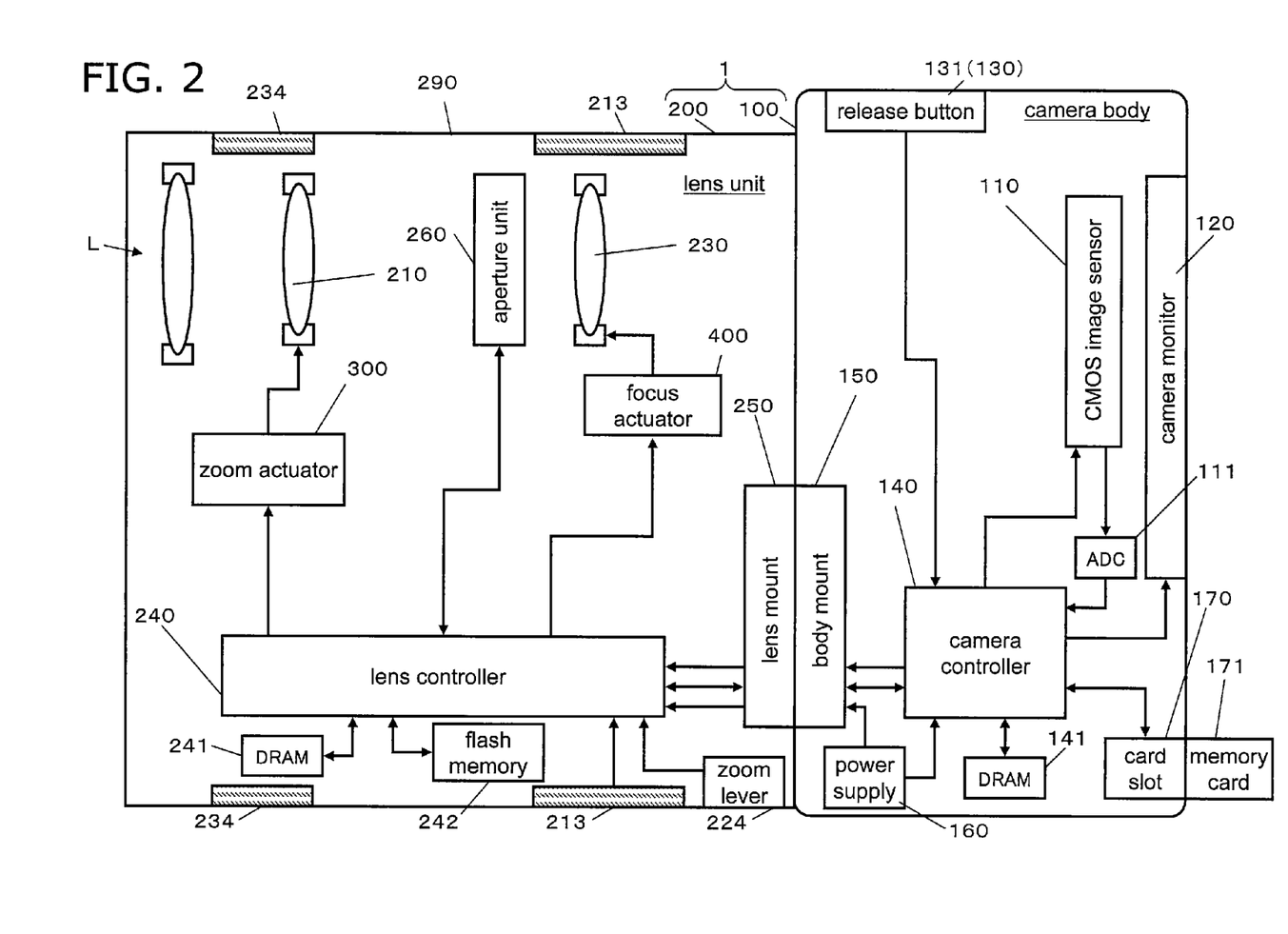
FIG. 2 is a block diagram of the camera system pertaining to the first embodiment.

The internal configuration of the camera system 1 will be described through reference to FIG. 2. FIG. 2 is a block diagram of the camera system 1. The functional configurations of the camera body 100 and the lens unit 200 will now be described.

(2-1) Camera Body 100

As shown in FIG. 2, the camera body 100 comprises the CMOS image sensor 110, an A/D converter 111, a camera monitor 120, the interface component 130, a camera controller 140, a DRAM 141, a body mount 150, a power supply 160, and a card slot 170.

The CMOS image sensor 110 is an imaging element that captures an optical image of a subject formed by the lens unit 200, and produces image data about the optical image of the subject. The image data produced by the CMOS image sensor 110 is digitized by the A/D converter 111. The image data digitized by the A/D converter 111 is subjected to various image processing by the camera controller 140. This "various image processing" includes gamma correction processing, white balance correction processing, scratch correction processing, Y luminance and Color difference signal (YC) conversion processing, electronic zoom processing, compression processing, and so forth. The image data that has undergone various image processing by the camera controller 140 is recorded as a moving picture file or a still picture file to a memory card 171. A CCD image sensor or the like can be used instead of the CMOS image sensor 110 as an imaging element.

The camera monitor 120 is a liquid crystal display disposed on the back face of the camera body 100. The camera monitor 120 displays recorded images, through-images, setting screens, and so forth. The images and screens displayed on the camera monitor 120 are produced by the camera controller 140. Recorded images are moving pictures and still pictures based on moving picture files and still picture files recorded to the memory card 171. Through-images are moving pictures that display in real time the images captured by the CMOS image sensor 110, and are not recorded to the memory card 171. Setting screens are screens used by the user to make settings related to imaging conditions and so forth of the camera system 1. The camera controller 140 interprets the setting content related to imaging conditions and so forth of the camera system 1 set on the setting screens by the user with the interface component 130, and reflects the settings of the various components of the camera system 1. The camera monitor 120 is not limited to being a liquid crystal display, and may instead be an organic Electro-Luminescence (EL) device, an inorganic EL device, a plasma display panel, or the like. The camera monitor 120 may also be disposed on a side face, the top face, or some other place rather than on the back face of the camera body 100.

The interface component 130 accepts user operations. The interface component 130 includes the release button 131 and the power switch 132 (not shown in FIG. 2; see FIG. 1). The release button 131 accepts timing input for the recording of moving and still pictures from the user. The power switch 132 accepts commands from the user to switch the power supply 160 on and off. Upon accepting a user operation, the interface component 130 immediately sends the camera controller 140 a signal indicating the operation content. The interface component 130 can be in any form, such as a button, a lever, a dial, or a touch panel.

The camera controller 140 is a microprocessor that includes a CPU and a ROM. The camera controller 140 uses the DRAM 141 as a working memory. The camera controller 140 controls the operation of the various components of the camera body 100, such as the CMOS image sensor 110 and the camera monitor 120, and thereby controls the overall operation of the entire camera body 100. The camera controller 140 can communicate with a lens controller 240 of the lens unit 200 via the body mount 150 and a lens mount 250 (discussed below). The camera controller 140 interprets the content of the user operation accepted by the interface component 130. The camera controller 140 controls the overall operation of the entire camera body 100 with the lens controller 240 based on the user operation.

The memory card 171 can be removably inserted into the card slot 170. The memory card 171 is a nonvolatile recording medium that stores image data and the like. The card slot 170 stores image data on the memory card 171 and reads image data and so forth from the memory card 171 according to a control signal from the camera controller 140.

The power supply 160 supplies power to the various components of the camera system 1. The power supply 160 may be, for example, a dry cell, or may be a rechargeable cell, or power may be supplied to the camera system 1 from the outside through a power cord or the like.

The body mount 150 removably holds the lens unit 200. The body mount 150 is mechanically and electrically connected to the lens mount 250 of the lens unit 200. The body mount 150 supplies the power supplied from the power supply 160 to the various components of the lens unit 200 via the lens mount 250.

(2-2) Lens Unit 200

As shown in FIG. 2, the lens unit 200 comprises the lens mount 250, an aperture unit 260, an optical system L, the lens barrel 290, the zoom ring 213 (one example of a second interface unit), the zoom lever 224 (one example of a first interface unit), a zoom actuator 300 (one example of an actuator), the focus ring 234, a focus actuator 400, the lens controller 240, a DRAM 241, and a flash memory 242.

The lens mount 250 is removably mounted to the body mount 150 of the camera body 100.

The aperture unit 260 adjusts the amount of light that passes through the optical system L. The aperture unit 260 has aperture vanes that can block part of the light rays passing through the optical system L, and an aperture driver for driving the aperture vanes. The lens controller 240 changes the amount in which the light rays are blocked by the aperture vanes by driving the aperture vanes with the aperture driver according to a control signal from the camera controller 140.

The optical system L forms an optical image of a subject. The optical system L includes a zoom lens 210 and a focus lens 230.

The zoom lens 210 is able to move parallel to the optical axis AX of the optical system L (see FIGS. 1 and 3) so as to change the focal distance of the optical system L. As the zoom lens 210 moves to the rear (the telephoto side), the focal distance of the optical system L increases, and as the zoom lens 210 moves to the front (wide angle side), the focal distance of the optical system L decreases. Thus, the focal distance of the optical system L can be adjusted by moving the zoom lens 210 along the optical axis AX. The zoom lens 210 is an example of a lens group used for zooming. The focus lens 230 is able to move parallel to the optical axis AX of the optical system L so as to change the focal state of the optical system L. The zoom lens 210 and the focus lens 230 may each be constituted by one or more lenses, or may be constituted by one or more groups of lenses.

The lens barrel 290 is a cylindrical member whose center axis is the optical axis AX. The lens barrel 290 is fixed to the lens mount 250. The aperture unit 260, the optical system L, and so forth are housed in the interior of the lens barrel 290. The zoom actuator 300, the focus actuator 400, the lens controller 240, and part of the zoom lever 224 are attached to the lens barrel 290. A rotation detector 215 (see FIG. 4; discussed below), a zoom lever return mechanism 225, and a slide detector 226 (see FIG. 5) are attached to the lens barrel 290.

The zoom ring 213 is a cylindrical member whose center axis is the optical axis AX, or in other words, is a ring-shaped member whose center axis is the optical axis AX. The zoom ring 213 is disposed on the outer peripheral face of the lens barrel 290. The zoom ring 213 is rotated by the user, and is a zoom setting interface unit used to gradually change the focal distance of the optical system L. The zoom ring 213 is manually turned in the peripheral direction by the user, and is thereby rotated in the peripheral direction. In this embodiment, the peripheral direction is defined as a direction around the optical axis AX, and whose center axis is the optical axis AX. The zoom ring 213 rotates while being operated by the user, and after the rotational operation by the user is finished, maintains its position at this finish. The configuration of the zoom ring 213 will be discussed in detail below.

In the following description, the amount in which the zoom ring 213 is turned by the user will be called the "rotation amount" of the zoom ring 213, and the direction in which the zoom ring 213 is turned by the user will be called the "rotation direction" of the zoom ring 213.

The zoom lever 224 is an arc-shaped member extending in the peripheral direction of the optical axis AX, and has a non-ring shape. The zoom lever 224 is disposed within an opening formed in the outer peripheral face of the lens barrel 290. The zoom lever 224 is adjacent to the zoom ring 213, and is disposed more to the user side than the zoom ring 213. When the lens unit 200 has been mounted to the camera body 100, the zoom lever 224 is disposed in a first quadrant when viewed from the subject side, the first quadrant is delineated by a coordinate system centered on the optical axis and having a horizontal axis that is parallel to the long-side direction of a CMOS image sensor 110 and a vertical axis that is parallel to the short-side direction of the CMOS image sensor 110. Therefore, the zoom lever 224 is disposed close to the upper-right of the lens unit 200 in a landscape orientation and when viewed from the subject side, and is disposed close to the upper-left or close to the lower-right in a portrait orientation. The portrait orientation is the orientation obtained by rotating by 90° clockwise or counter-clockwise from the landscape orientation when viewed from the subject side. Therefore, whether in landscape orientation or portrait orientation, the user can easily turn the zoom ring 213 with the left hand while sliding the zoom lever 224 with the same hand. In portrait orientation, the zoom lever 224 can be operated with the index finger of the left hand when the zoom lever 224 is located near the upper-left, and the zoom lever 224 can be operated with the thumb of the left hand when the zoom lever 224 is located near the lower-right.

The zoom lever 224 is an interface unit for zoom setting, used to change the focal distance of the optical system L quickly. The zoom lever 224 is located at a specific home position when not being slid by the user. The zoom lever 224 is manually slid in the peripheral direction by the user. The configuration of the zoom lever 224 will be discussed in further detail below.

In the following description, the amount in which the zoom lever 224 is slid by the user will be called the "slide amount" of the zoom lever 224, and the direction in which the zoom lever 224 is slid by the user will be called the "slide direction" of the zoom lever 224.

The zoom actuator 300 is a drive unit that drives the zoom lens 210 so as to adjust the focal distance of the optical system L. The configuration of the zoom actuator 300 will be discussed below.

The lens controller 240 is a microprocessor that includes a CPU and a ROM. The lens controller 240 uses the DRAM 241 as a working memory. The lens controller 240 controls the operation of the zoom actuator 300, the focus actuator 400, and so forth, and thereby controls the overall operation of the entire lens unit 200. The lens controller 240 can communicate with the camera controller 140 of the camera body 100 via the body mount 150 and the lens mount 250.

When the zoom lever 224 is slid by the user, or when the zoom ring 213 is turned by the user, the lens controller 240 drives the zoom actuator 300 so as to change the focal distance of the optical system L. Therefore, the sliding of the zoom lever 224 and the turning of the zoom ring 213 are examples of a "drive operation" for driving the zoom actuator 300, and are examples of an "adjustment operation" for adjusting the focal distance of the optical system L. As discussed above, the zoom lever 224 is an interface unit for zoom setting, used to change the focal distance of the optical system L quickly, and the zoom ring 213 is an interface unit for zoom setting, used to change the focal distance of the optical system L slowly. In other words, the zoom lever 224 is a rough-adjustment interface unit, while the zoom ring 213 is a fine-adjustment interface unit. Therefore, in this embodiment, the lens controller 240 makes the rate of change in the focal distance by sliding the zoom lever 224 faster than the rate of change in the focal distance by turning the zoom ring 213.

The lens controller 240 executes zoom processing tied to the sliding of the zoom lever 224 whenever it is decided that the zoom lever 224 has been slid from its home position. During this zoom processing, if it is decided that the slide direction is clockwise in the peripheral direction (an example of a first direction) when viewed from the subject side, the lens controller 240 rotationally drives a zoom motor 310 so that the zoom lens 210 moves to the rear (the telephoto side) in a direction parallel to the optical axis AX. The lens controller 240 here rotationally drives the zoom motor 310 so that the rate of change in the focal distance of the optical system L, the rate of movement of the zoom lens 210, or the rate of rotation of the zoom motor 310 is constant. On the other hand, if it is decided that the slide direction is counter-clockwise in the peripheral direction (an example of a second direction) when viewed from the subject side, the lens controller 240 rotationally drives the zoom motor 310 so that the zoom lens 210 moves to the front (the wide angle side) in a direction parallel to the optical axis AX. The lens controller 240 here rotationally drives the zoom motor 310 so that the rate of change in the focal distance of the optical system L, the rate of movement of the zoom lens 210, or the rate of rotation of the zoom motor 310 is constant. The lens controller 240 does not execute this zoom processing if it is decide that the zoom lever 224 has not been slid from its home position.

When the zoom ring 213 has been turned, the lens controller 240 executes zoom processing tied to the turning of the zoom ring 213. During this zoom processing, the lens controller 240 uses the target position of the zoom lens 210 as a control parameter. The lens controller 240 is always awaiting signals from photosensors 215a and 215b (discussed below; see FIG. 4) and thereby constantly decides whether or not there is any turning by the user. Whenever it is decided that the zoom ring 213 has been turned, the lens controller 240 determines the rotation amount and rotation direction of the zoom ring 213. If it is decided that the rotation direction is clockwise in the peripheral direction as viewed from the subject side, the lens controller 240 updates the target position so that it is shifted by an amount corresponding to the rotational amount, to the rear in a direction parallel to the optical axis AX. On the other hand, if the rotation direction is determined to be counter-clockwise in the peripheral direction as viewed from the subject side, the lens controller 240 updates the target position so that it is shifted by an amount corresponding to the rotation amount, to the front in a direction parallel to the optical axis AX. The lens controller 240 updates the target position at specific time intervals while rotationally driving the zoom motor 310 so that the zoom ring 213 reaches the updated target position.

The flash memory 242 is a nonvolatile memory that holds control programs, parameters, and so forth for controlling the lens controller 240.

The focus ring 234 is a cylindrical member whose center axis is the optical axis AX, and in other words is a ring-shaped member whose center axis is the optical axis AX. The focus ring 234 is disposed on the outer peripheral face of the lens barrel 290. The focus ring 234 is adjacent to the zoom ring 213 and is disposed more to the subject side than the zoom ring 213. The focus ring 234 is an interface unit that is turned by the user. The focus ring 234 is manually turned in the peripheral direction by the user, and thereby the focus ring 234 is rotationally operated. The rotation amount and rotation direction of the focus ring 234 are detected by a rotation detector (not shown). The rotation detector used for the focus ring 234 is constituted by a photosensor or the like.

The focus actuator 400 is a drive unit that drives the focus lens 230 so as to change the focal state of the optical system L. The configuration of the focus actuator 400 will be discussed below.

(3) Detailed Configuration of Zoom Actuator 300 and Focus Actuator 400

Figure 3:
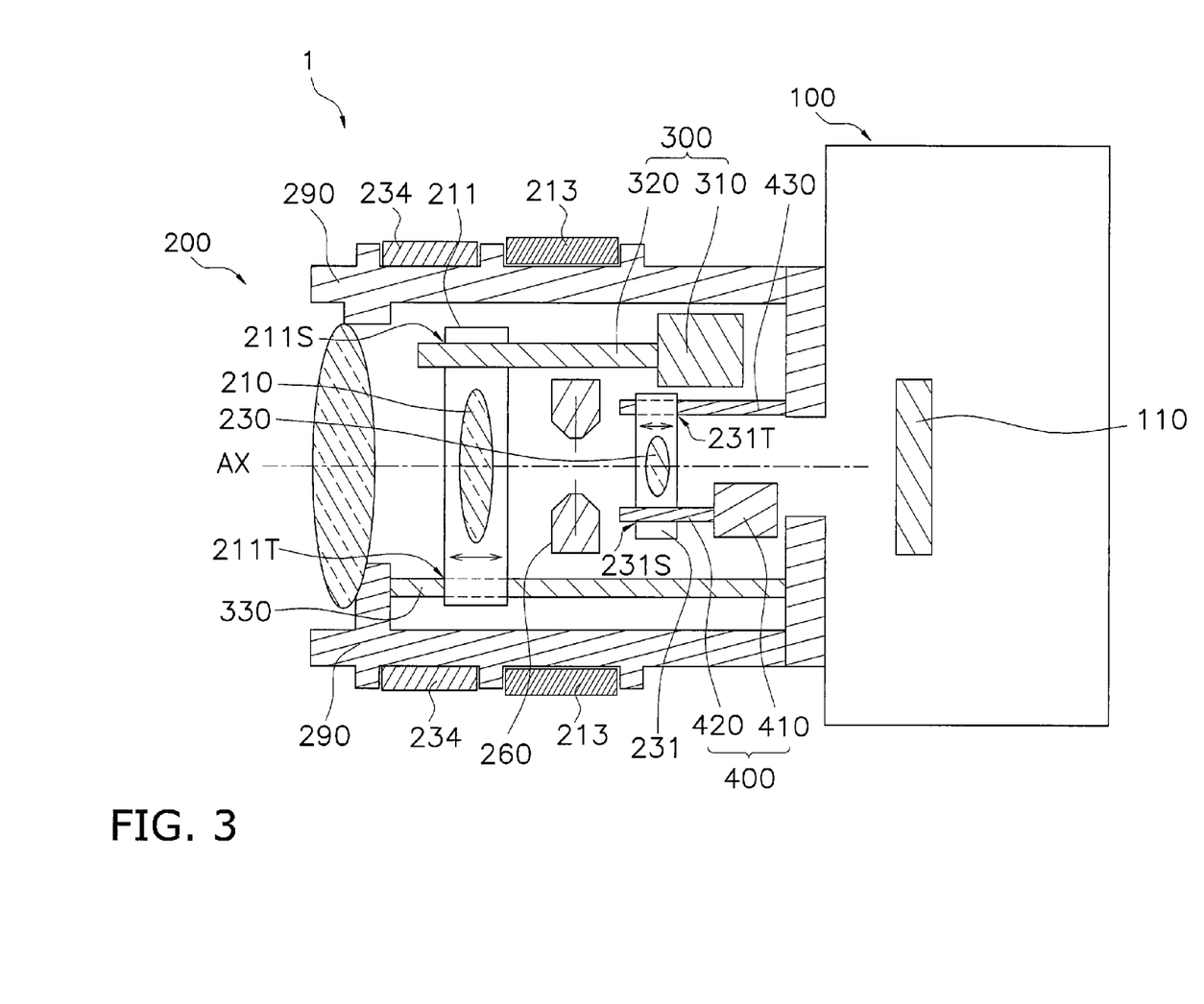
FIG. 3 is a cross section in the longitudinal direction of the camera system pertaining to the first embodiment.

The detailed configuration of the zoom actuator 300 and the focus actuator 400 will be described through reference to FIG. 3. FIG. 3 is a cross section of the camera system 1, cut by a plane that includes the optical axis AX.

(3-1) Zoom Actuator 300

As shown in FIG. 3, the zoom actuator 300 has the zoom motor 310 and a screw 320. The rotary shaft of the zoom motor 310 (not shown) extends parallel to the optical axis AX. The screw 320 extends parallel to the optical axis AX. The screw 320 is engaged with a first hole 211S formed in a zoom lens support frame 211 that supports the zoom lens 210. A guide shaft 330 is inserted in a second hole 211T formed in the zoom lens support frame 211. The guide shaft 330 extends parallel to the optical axis AX. The zoom lens 210 supported by the zoom lens support frame 211 is permitted by the guide shaft 330 to move parallel to the optical axis AX, but restricted from moving in a direction perpendicular to the optical axis AX. The rotary shaft of the zoom motor 310 is linked to the screw 320. Therefore, when the zoom motor 310 is rotationally driven, the screw 320 rotates, and the zoom lens 210 supported by the zoom lens support frame 211 moves parallel to the optical axis AX.

(3-2) Focus Actuator 400

As shown in FIG. 3, the focus actuator 400 has a focus motor 410, a screw 420, and a guide shaft 430. The shaft of the focus motor 410 (not shown) extends parallel to the optical axis AX. The screw 420 and the guide shaft 430 extend parallel to the optical axis AX. The screw 420 and the guide shaft 430 are engaged with a first hole 231S formed in a focus lens support frame 231 that supports the focus lens 230. The guide shaft 430 is inserted into a second hole 231T formed in the focus lens support frame 231. The rotary shaft of the focus motor 410 is linked to the screw 420. Therefore, when the focus motor 410 is rotationally driven, the screw 420 rotates, and the focus lens 230 supported by the focus lens support frame 231 moves parallel to the optical axis AX.

(4) Configuration Around Zoom Ring 213

Figure 4:
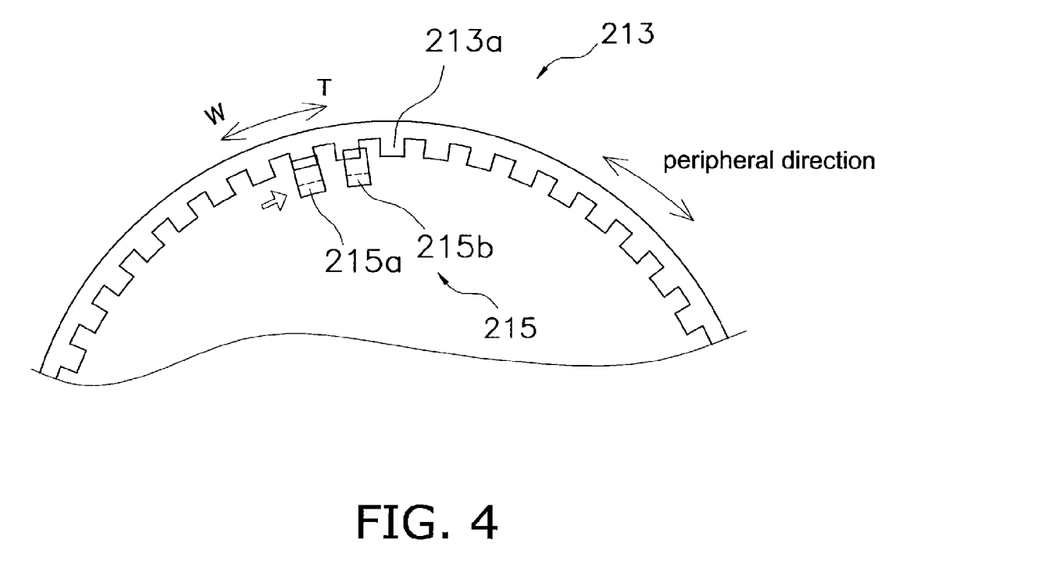
FIG. 4 is a configuration diagram of a zoom ring and a rotation detector pertaining to the first embodiment.

Next, the configuration around the zoom ring 213 will be described through reference to FIG. 4. FIG. 4 is a is a cross section of the zoom ring 213 and the rotation detector 215 cut by a plane perpendicular to the optical axis AX.

As shown in FIG. 4, the zoom ring 213 has a plurality of comb teeth 213a. These comb teeth 213a are formed equidistantly spaced in the peripheral direction around the inner peripheral face of the zoom ring 213. Rotation of the comb teeth 213a is detected by the rotation detector 215 attached to the lens barrel 290.

Here, the rotation detector 215 has the two photosensors 215a and 215b. The photosensors 215a and 215b are disposed in line in the peripheral direction. The photosensors 215a and 215b each have a light emitter and a light receptor. The paired light emitter and light receptor are disposed so as to sandwich the path traveled by the comb teeth 213a. The photosensors 215a and 215b each detect the passage of the comb teeth 213a between the light emitter and light receptor. The lens controller 240 determines the rotation amount and rotation direction of the zoom ring 213 on the basis of the detection result produced by the photosensors 215a and 215b.

(5) Configuration Around Zoom Lever 224

Figure 5:
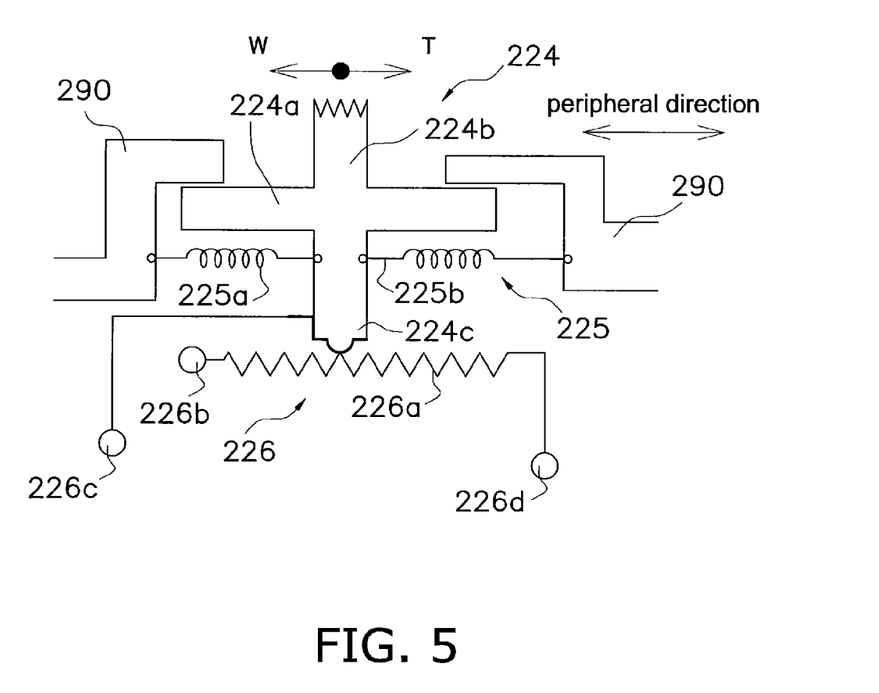
FIG. 5 is a configuration diagram of a zoom lever, a zoom lever return mechanism, and a slide detector pertaining to the first embodiment.

Next, the configuration around the zoom lever 224 will be described through reference to FIG. 5. FIG. 5 is a cross section of the zoom lever 224, the zoom lever return mechanism 225, and the slide detector 226 cut by a plane perpendicular to the optical axis AX.

As shown in FIG. 5, the zoom lever 224 has a flat base component 224a, a knob 224b, and a slider 224c. The zoom lever 224 is an interface unit that is slid by the user. The base component 224a has a non-ring shape, and is formed in an arc shape in the peripheral direction. The knob 224b protrudes outside of the lens barrel 290 from the base component 224a. The knob 224b is a portion of the zoom lever 224 which the user can catch with a finger. When force in the peripheral direction is manually imparted to the knob 224b by the user, the zoom lever 224 slides in the peripheral direction. However, the zoom lever 224 can also be slid if the user imparts force to the base component 224a. The slider 224c protrudes inside the lens barrel 290 from the base component 224a. Sliding of the zoom lever 224 is detected by the slide detector 226 attached to the lens barrel 290.

The slide detector 226 here has a resistance member 226a and three terminals 226b to 226d. When the zoom lever 224 is slid in the peripheral direction, the slider 224c slides over the resistance member 226a. When there is a change in the position of the slider 224c on the resistance member, there is also a change in a first resistance value of the resistance member 226a between the first terminal 226b and the second terminal 226c, and in a second resistance value between the second terminal 226c and the third terminal 226d. The lens controller 240 detects either the first resistance value or the second resistance value, or both. The lens controller 240 determines the timing at which the zoom lever 224 is slid from its home position, the slide amount, and the slide direction on the basis of the detected resistance values.

Also, the zoom lever 224 is linked to the lens barrel 290 via the zoom lever return mechanism 225. The zoom lever return mechanism 225 automatically returns the zoom lever 224 to its home position when the user releases the zoom lever 224. The zoom lever return mechanism 225 has biasing springs 225a and 225b. These biasing springs 225a and 225b bias the zoom lever 224 that has been slid from its home position so that it returns to the home position. Thus, the zoom lever 224 is an automatic-return type of mechanical slide lever. Therefore, the zoom lever 224 slides from its home position while being operated by the user, and returns to the home position it was in prior to the sliding operation once the sliding by the user is finished.

(6) Action and Effect

As discussed above, the lens unit 200 has two interface units, namely, the zoom lever 224 and the zoom ring 213, for zoom setting, and both of these are operated in the peripheral direction. As a result, it is easier to set the zoom.

Also, as discussed above, the lens controller 240 controls the zoom actuator 300 so as to change the focal distance of the optical system L to the telephoto side when the zoom lever 224 and the zoom ring 213 are each operated clockwise in the peripheral direction when viewed from the subject side, and controls the zoom actuator 300 so as to change the focal distance of the optical system L to the wide angle side when the operation is counter-clockwise in the peripheral direction when viewed from the subject side. In other words, when the zoom lever 224 and the zoom ring 213 are each operated clockwise in the peripheral direction when viewed from the subject side, the result of the operation is a change in the focal distance of the optical system L to the telephoto side, and when they are operated counter-clockwise in the peripheral direction when viewed from the subject side, the result of the operation is a change in the focal distance of the optical system L to the wide angle side.

Therefore, the lens unit 200 has two interface units, namely, the zoom lever 224 and the zoom ring 213, for zoom setting, and the operation direction to the telephoto side and the wide angle side is the same for both of these. As a result, the user can intuitively grasp the direction of operation to the telephoto side and the wide angle side in zoom setting.

Also, as discussed above, the lens controller 240 controls the zoom actuator 300 so that the zoom lens 210 moves while the zoom lever 224 is being operated. Also, the lens controller 240 controls the zoom actuator 300 so that the zoom lens 210 moves according to the amount in which the zoom ring 213 is operated while the zoom lever 224 is not being operated. That is, the zoom lever 224 and the zoom ring 213 are both interface units that accept commands from the user to drive the zoom actuator 300, which drives the zoom lens 210 electrically. As a result, both rough and fine zoom settings can be easily carried out by the user with relatively light effort by making use of electrical force.

Second Embodiment (1) External Configuration of Camera System 101

The external configuration of the camera system 101 pertaining to a second embodiment will be described through reference to FIG. 6.

Figure 6:
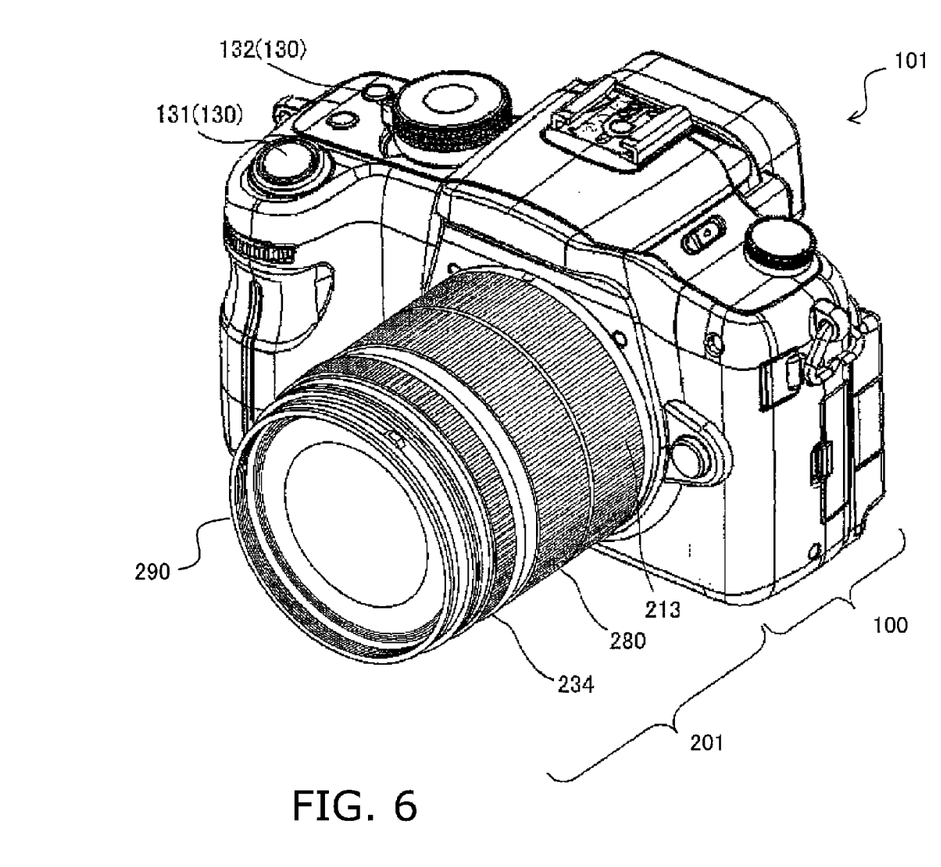
FIG. 6 is an oblique view of a camera system pertaining to a second embodiment.

As shown in FIG. 6, the camera system 101 comprises a camera body 100 and a lens unit 201 (an example of a lens barrel) that can be attached to and removed from the camera body 100. What is different from the camera system 1 pertaining to the first embodiment is that the lens unit 201 has a mechanical zoom ring 280 instead of the electrical zoom lever 224 of the lens unit 200. The configuration of the lens unit 201 will now be described, focusing on how it differs from the lens unit 200. Those elements that have the same configuration will be numbered the same.

(2) Internal Configuration of Camera System 101

Figure 7:
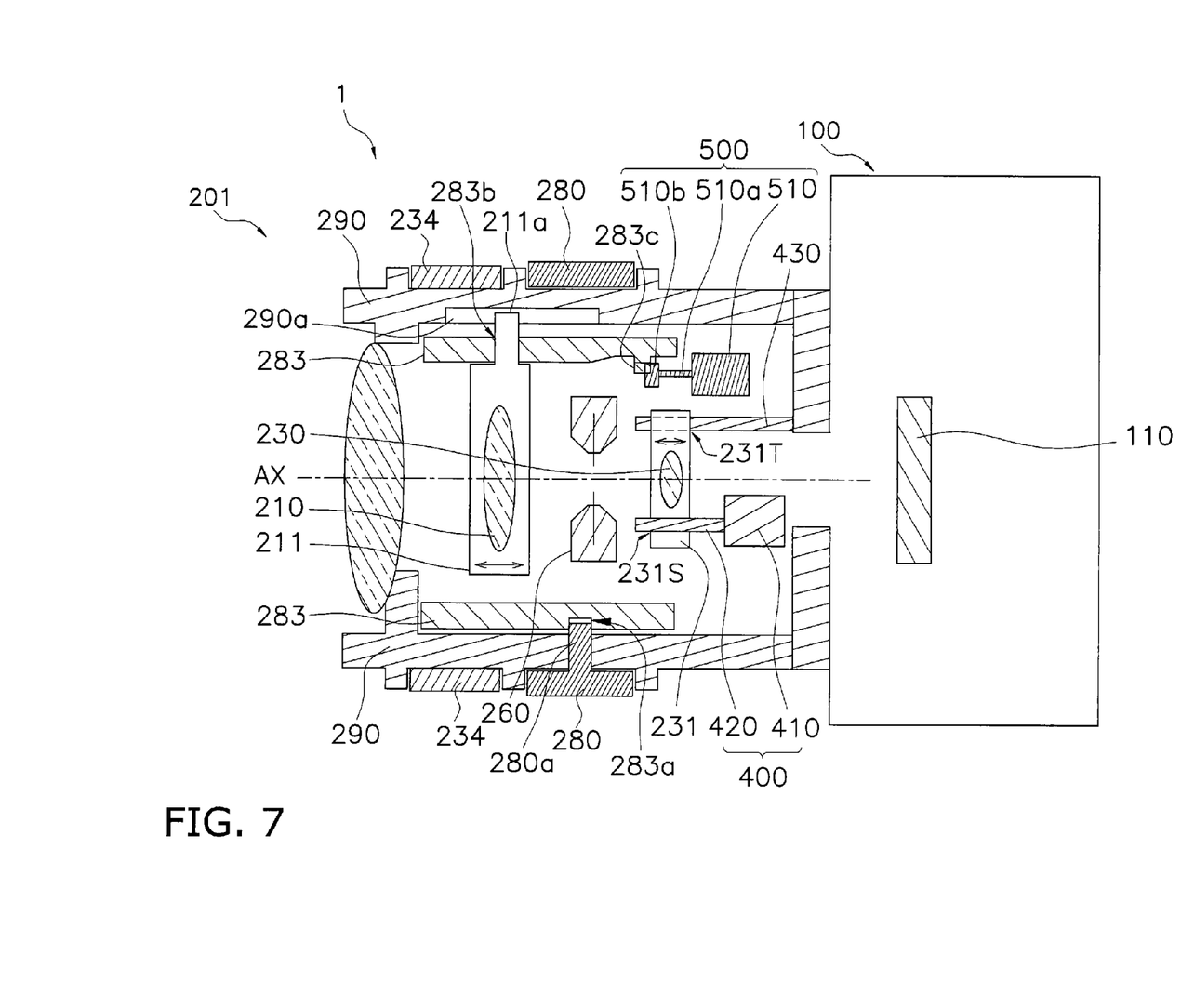
FIG. 7 is a cross section in the longitudinal direction of the camera system pertaining to the second embodiment.

Next, the internal configuration of the camera system 101 will be described through reference to FIG. 7. FIG. 7 is a cross section of the camera system 101, cut by a plane that includes the optical axis AX. The configuration of the camera body 100 is as described for the first embodiment, so just the configuration of the lens unit 201 will be described below.

What is different from the lens unit 200 pertaining to the first embodiment is that the lens unit 201 has the zoom ring 280 and a cam barrel 283 instead of the zoom lever 224, and that the lens unit 201 has a zoom actuator 500 instead of the zoom actuator 300. These differences will be described below.

(2-1) Configuration Around Zoom Ring 280

The zoom ring 280 (an example of a second interface unit) is a cylindrical member whose center axis is the optical axis AX, or in other words, is a ring-shaped member whose center axis is the optical axis AX. The zoom ring 280 is disposed on the outer peripheral face of the lens barrel 290. The zoom ring 280 is adjacent to the zoom ring 213 and inside diameter more to the subject side than the zoom ring 213. The zoom ring 280 is rotated by the user, and is a zoom setting interface unit used to quickly change the focal distance of the optical system L. That is, the zoom ring 280 is an interface unit for the fine adjustment of zoom setting, whereas the zoom ring 213 is an interface unit for the rough adjustment of zoom setting.

The zoom ring 280 is manually turned by the user in the peripheral direction, and thereby the zoom ring 280 is rotationally operated. Again in this embodiment, the peripheral direction is defined as a direction around the optical axis AX whose center axis is the optical axis AX. The zoom ring 280 is also able to rotate within a specific rotational range in the peripheral direction over the outer peripheral face of the lens barrel 290. In response to the rotation of the zoom ring 280, the zoom lens 210 moves within a specific linear range in a direction parallel to the optical axis AX. Therefore, the positions of the zoom ring 280 within the specific rotational range corresponding to certain positions of the zoom lens 210 within the specific linear range. In this embodiment, the specific rotational range of the zoom ring 280 is approximately 50° to approximately 100°.

The zoom ring 280 rotates while being operated by the user, and maintains its final position after the rotation by the user is finished. The zoom ring 280 rotatably supports the cam barrel 283.

A protrusion 280a is formed on the inner peripheral face of the zoom ring 280. The protrusion 280a is inserted into an opening formed in the lens barrel 290, and the distal end of the protrusion 280a is engaged with a hole 283a in the cam barrel 283 (discussed below) inside the lens barrel 290.

The cam barrel 283 is a cylindrical member whose center axis is the optical axis AX. The cam barrel 283 is housed inside the lens barrel 290. The cam barrel 283 is supported so that it is able to rotate with respect to the lens barrel 290, but does not move in a direction parallel to the optical axis AX.

Three cam grooves 283b are formed in the cam barrel 283. The three cam grooves 283b are spaced apart equidistantly in the peripheral direction. The three cam grooves 283b each extend in a direction that intersects the optical axis AX and the peripheral direction. Three rectilinear grooves 290a are formed on the inside of the lens barrel 290. The three rectilinear grooves 290a extend in a direction parallel to the optical axis AX. Three cam pins 211a are formed on the zoom lens support frame 211 that supports the zoom lens 210. The three cam pins 211a are respectively inserted into the three cam grooves 283b. Also, the three cam pins 211a are respectively inserted into the three rectilinear grooves 290a. The three cam pins 211a are respectively able to move along the three cam grooves 283b. Also, the three cam pins 211a are respectively able to move along the three rectilinear grooves 290a.

When the zoom ring 280 is manually turned by the user, the entire cam barrel 283 also rotates in the peripheral direction. When the cam barrel 283 rotates in the peripheral direction, the cam pins 211a move along the cam grooves 283b. Since the cam pins 211a are also inserted into the rectilinear grooves 290a, the cam pins 211a do not rotate around the optical axis. The cam pins 211a move in a direction parallel to the optical axis AX. Therefore, when the zoom ring 280 is manually turned by the user, the zoom lens 210 is mechanically driven in a direction parallel to the optical axis AX, and the focal distance of the optical system L is adjusted.

As discussed above, the rotational force produced when the zoom ring 280 is turned by the user is transmitted to the zoom lens 210 only through mechanical parts such as a cam mechanism. The protrusion 280a of the zoom ring 280, the cam barrel 283, the lens support frame 211, and the lens barrel 290 constitute a "transmission mechanism" that mechanically transmits motive force received by the zoom ring 280 from the user to the zoom lens 210.

(2-2) Configuration of Zoom Actuator 500

The zoom actuator 500 has a zoom motor 510, a rotational shaft 510a, and a gear 510b.

The zoom motor 510 is rotationally driven by the lens controller 240 so as to vary the focal distance of the optical system L in response to rotation of the zoom ring 213 by the user. The method by which the zoom motor 510 is controlled by the lens controller 240 is the same as the method for controlling the zoom motor 310 in the first embodiment.

The rotational shaft 510a of the zoom motor 510 extends parallel to the optical axis AX. The gear 510b is linked to the distal end of the rotational shaft 510a of the zoom motor 510. The numerous teeth included in the gear 510b are disposed aligned in the peripheral direction. A gear 283c is formed on the inner peripheral face of the cam barrel 283. The numerous teeth included in the gear 283c are disposed aligned in the peripheral direction. The gear 510b engages with the gear 283c. Therefore, when the zoom motor 510 is rotationally driven, the gear 510b rotates in the peripheral direction, and the gear 283c meshed with the gear 510b also rotates in the peripheral direction. When the gear 283c rotates in the peripheral direction, the entire cam barrel 283 also rotates in the peripheral direction. When the cam barrel 283 rotates in the peripheral direction, the zoom lens support frame 211 that supports the zoom lens 210 moves in a direction that is parallel to the optical axis AX. Therefore, just as in the first embodiment above, when the zoom ring 213 is turned manually by the user, the zoom lens 210 is driven electrically in a direction parallel to the optical axis AX, and the focal distance of the optical system L is adjusted.

(3) Action and Effect

As discussed above, the lens unit 201 has two interface units, namely, the zoom rings 213 and 280, for zoom setting, and both of these are operated in the peripheral direction. As a result, it is easier to set the zoom.

Also, when the zoom rings 213 and 280 are each operated clockwise in the peripheral direction when viewed from the subject side, they change the focal distance of the optical system L to the telephoto side, and when operated counter-clockwise in the peripheral direction when viewed from the subject side, they change the focal distance of the optical system L to the wide angle side. Therefore, the lens unit 201 has two interface units, namely, the zoom rings 213 and 280, for zoom setting, and the operation direction to the telephoto side and the wide angle side is the same for both of these. As a result, the user can intuitively grasp the direction of operation to the telephoto side and the wide angle side in zoom setting.

Also, as discussed above, the lens controller 240 controls the zoom motor 510 so that the zoom lens 210 moves according to how much the zoom ring 213 is operated. That is, the zoom ring 213 is an interface unit that accepts commands from the user to drive the zoom motor 510, which drives the zoom lens 210 electrically. As a result, fine zoom setting can be easily carried out by the user with relatively light effort by making use of electrical force.

Modification Examples

The present invention is not limited to or by the above embodiments, and various modifications are possible without departing from the gist of the invention. The following modification examples are possible, for instance.

(A)

In the above embodiments, there were two zoom setting interface units that were operated in the peripheral direction. However, a single lens unit may include three or more interface units that are operated in the peripheral direction.

(B)

The first embodiment included the zoom lever 224, which drove the zoom lens 210 electrically, and the zoom ring 213, which drove the zoom lens 210 electrically. In the second embodiment, there was the zoom ring 280, which drove the zoom lens 210 mechanically, and the zoom ring 213, which drove the zoom lens 210 electrically.

However, a single lens unit may include a zoom lever that electrically drives the zoom lens 210, and a zoom ring that mechanically drives the zoom lens 210. A single lens unit may include two zoom rings that electrically drive the zoom lens 210. Or, a single lens unit may include two zoom levers that mechanically drive the zoom lens 210. Or, a single lens unit may include two zoom levers that electrically drive the zoom lens 210.

(C)

In the first embodiment, the operation directions to the telephoto side and the wide angle side were the same for the zoom lever 224 and the zoom ring 213, but the operation directions to the telephoto side and the wide angle side may be opposite for the zoom lever 224 and the zoom ring 213. Similarly, in the second embodiment, the operation directions to the telephoto side and the wide angle side were the same for the zoom rings 213 and 280, but the operation directions to the telephoto side and the wide angle side may be opposite for the zoom rings 213 and 280.

Furthermore, with an interface unit that electrically drives the zoom lens 210, the design may be such that the setting of the operation direction to the telephoto side and the wide angle side can be freely changed on a setting screen displayed on the camera monitor 120.

(D)

In the above embodiments, the lens controller 240 controlled the zoom actuator 300 or the zoom motor 510 so that the zoom lens 210 moved according to how much the zoom ring 213 was operated. However, it may instead control the zoom actuator 300 or the zoom motor 510 so that the zoom lens 210 moves according to the speed at which the zoom ring 213 is operated.

(E)

In the first embodiment, the entire zoom lever 224 was disposed in a first quadrant delineated by the above-mentioned specific coordinate system. However, just part of the zoom lever 224 may be disposed in the first quadrant. Also, at least part of the zoom lever 224 may be disposed in second to fourth quadrants delineated by the above-mentioned specific coordinate system.

(F)

Figure 8:
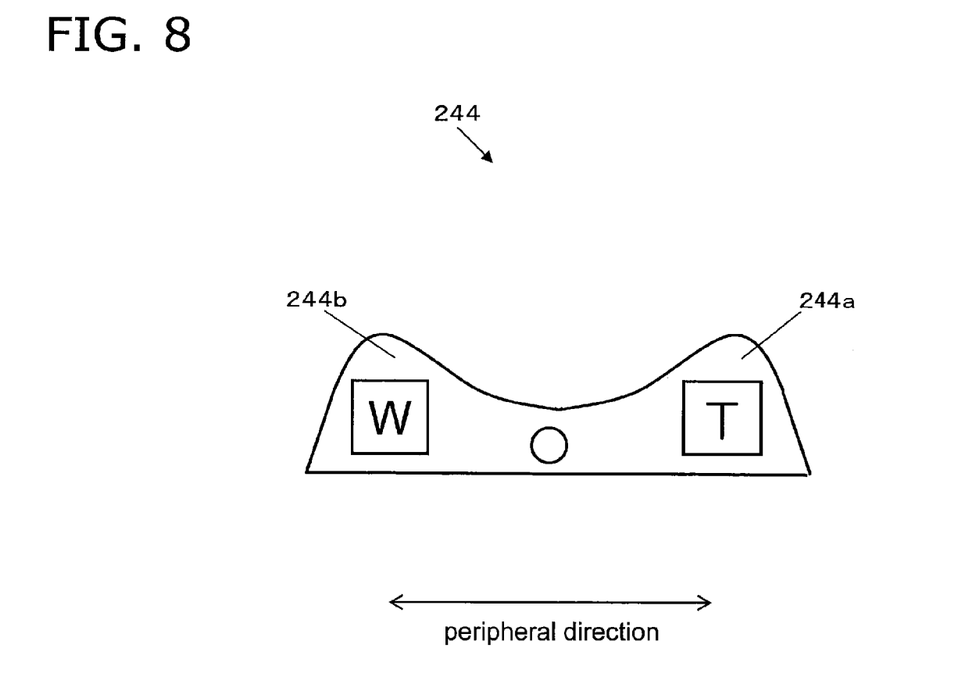
FIG. 8 is a diagram of an interface unit pertaining to Modification Example 1.

In the above embodiments, the zoom lever 224 and/or the zoom ring 213 may be changed to an interface unit 244 pertaining to Modification Example 1, shown in FIG. 8.

The interface unit 244 pertaining to Modification Example 1 has a telephoto interface component 244a and a wide angle interface component 244b disposed aligned with the telephoto interface component 244a in the peripheral direction. The interface unit 244 is a toggle switch, so that the telephoto interface component 244a and the wide angle interface component 244b cannot both be pressed at the same time. The lens controller 240 rotationally drives the zoom motors 310 and 510, etc., in a direction in which the zoom lens 210 moves more toward the telephoto side when it is determined that the telephoto interface component 244a has been pressed, and rotationally drives the zoom motors 310 and 510, etc., in a direction in which the zoom lens 210 moves more toward the wide angle side when it is determined that the wide angle interface component 244b has been pressed.

The user can operate the interface unit 244 in the peripheral direction by moving a finger in the peripheral direction when selecting whether to press the telephoto interface component 244a or the wide angle interface component 244b.

(G)

Figure 9:
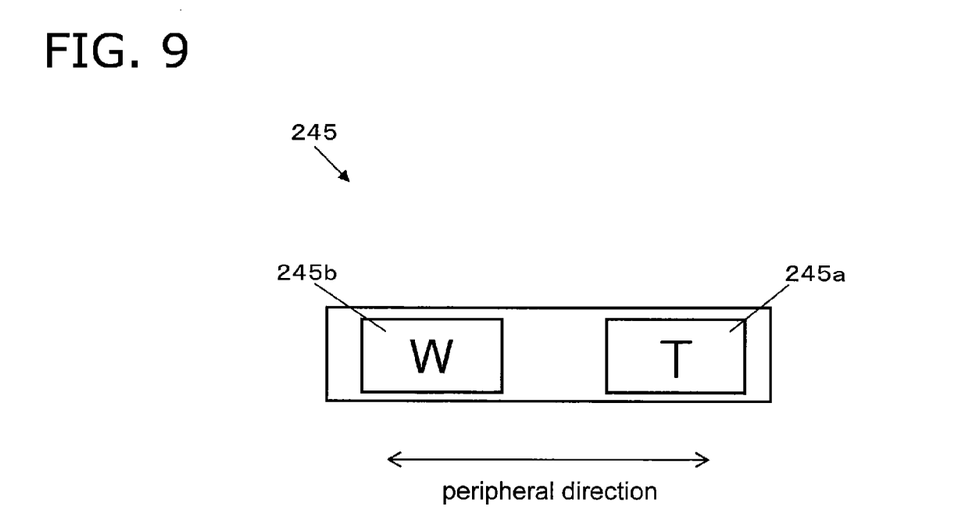
FIG. 9 is a diagram of an interface unit pertaining to Modification Example 2.

In the above embodiments, the zoom lever 224 and/or the zoom ring 213 may be changed to an interface unit 245 pertaining to a Modification Example 1, shown in FIG. 9.

The interface unit 245 pertaining to Modification Example 2 has a telephoto button 245*a* and a wide angle button 245*b* that is aligned with the telephoto button 245*a* along the peripheral direction. The interface unit 245 is a set of the physically separated buttons 245*a* and 245*b*. The lens controller 240 rotationally drives the zoom motors 310 and 510, etc., in a direction in which the zoom lens 210 moves more toward the telephoto side when it is determined that the telephoto button 245*a* has been pressed, and rotationally drives the zoom motors 310 and 510, etc., in a direction in which the zoom lens 210 moves more toward the wide angle side when it is determined that the wide angle button 245*b* has been pressed.

The user can operate the interface unit 244 in the peripheral direction by moving a finger in the peripheral direction when selecting whether to press the telephoto button 245*a* or the wide angle button 245*b*.

(H)

In the first embodiment, the zoom lever 224 was an interface unit used to quickly change the focal distance of the optical system L, and the zoom ring 213 was an interface unit used to slowly change the focal distance of the optical system L. Viewed from a different perspective, the zoom lever 224 is suited to operation in which the rate of change in the focal distance of the optical system L, the rate of movement of the zoom lens 210, or the rate of rotation of the zoom motor 310 is constant (particularly well suited to moving picture capture), whereas the zoom ring 213 is suited to fine adjustment in zoom setting, and is also suited to quickly changing to the targeted focal distance (image angle). That is, in the first embodiment, the operation purpose and application were different for the zoom lever 224 and the zoom ring 213.

However, the zoom ring 213 may be an interface unit used to quickly change the focal distance of the optical system L, and the zoom lever 224 may be an interface unit used to slowly change the focal distance of the optical system L. Or, both may have the same purpose or application.

(I)

In the first embodiment, when the zoom lever 224 was slid, the rate of change in the focal distance of the optical system L, the rate of movement of the zoom lens 210, or the rate of rotation of the zoom motor 310 was constant, but the rate may be controlled continuously or in stages according to the slide amount.

(J)

In the first embodiment, the positional relation between the zoom lever 224 and the zoom ring 213 in the optical axis AX direction may be reversed.

(K)

In the second embodiment, the positional relation between the zoom ring 213 and the zoom ring 280 in the optical axis AX direction may be reversed.

(L)

In the above embodiments, clockwise operation when viewed from the subject side was assumed to be operation to the wide angle side, and counter-clockwise operation was assumed to be operation to the telephoto side, but this may be reversed.

(M)

The modification examples given above may be combined as desired.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a lens barrel. Accordingly, these terms, as utilized to describe the present invention should be interpreted relative to a lens barrel.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present disclosure, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present disclosure are provided for illustration only, and not for the purpose of limiting the invention as defined by the appended claims and their equivalents.

The invention claimed is:

1. A lens barrel comprising:
an optical system including an optical axis and a focal distance configured to be adjusted by the optical system; and
a plurality of interface units including a first interface unit and a second interface unit, each of the first interface unit and the second interface unit being configured to accept from a user an operation to adjust the focal distance,
each of the first interface unit and the second interface unit being configured to be operated around the optical axis;
wherein the first interface unit and the second interface unit are configured to be operated in a first direction about the optical axis of the optical system to change the focal distance to the wide angle side, and
the first interface unit and the second interface unit are configured to be operated in a second direction opposite to the first direction about the optical axis of the optical system to change the focal distance to the telephoto angle side.

2. The lens barrel according to claim 1, further comprising:
the optical system having a zooming lens group; and
an actuator configured to drive the zooming lens group so as to adjust the focal distance of the optical system,
each of the first interface unit and the second interface unit being configured to accept from the user a drive operation for the actuator.

3. The lens barrel according to claim 1, further comprising:
the optical system having a zooming lens group;
an actuator configured to drive the zooming lens group so as to adjust the focal distance of the optical system; and
a transmission mechanism configured to mechanically transmit a drive force from the actuator to the zooming lens group, the drive force being related to the adjustment operation from the user and accepted by the second interface unit to adjust the focal distance of the optical system,
the first interface unit being configured to accept from the user a drive operation for the actuator.

4. The lens barrel according to claim 1, wherein:
the first interface unit has a non-ring shape, and
the second interface unit has a ring shape.

5. The lens barrel according to claim 1, wherein:
the first interface unit has a ring shape, and
the second interface unit has a ring shape.

6. The lens barrel according to claim 1, wherein, when mounted to a camera body that includes an imaging element:
at least part of the first interface unit is disposed in a first quadrant of a coordinate system when viewed from a subject side, the coordinate system being centered on the optical axis and having a horizontal axis and a vertical axis; and
the horizontal axis is parallel to a longitudinal direction of the imaging element and the vertical axis is parallel to the transverse direction of the imaging element.

7. The lens barrel according to claim 1, wherein:
at least one of the first interface unit and the second interface unit includes a telephoto interface component and a wide angle interface unit, at least one of the first interface unit and the second interface unit configured to be operated around the optical axis of the optical system via operation of the telephoto interface component and the wide angle interface unit; and
the telephoto interface component is configured to increase the focal distance of the optical system, and the wide angle interface unit is configured to decrease the focal distance of the optical system, the telephoto interface component and the wide angle interface unit being positioned in line with one another around the optical axis of the optical system.

* * * * *